US008059813B2

(12) United States Patent
Akimoto

(10) Patent No.: US 8,059,813 B2
(45) Date of Patent: Nov. 15, 2011

(54) CONTROL METHOD OF COMMUNICATION TERMINAL THE COMMUNICATION TERMINAL AND CONTROL PROGRAM OF THE COMMUNICATION TERMINAL

(75) Inventor: Naoto Akimoto, Chigasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1161 days.

(21) Appl. No.: 11/286,589

(22) Filed: Nov. 23, 2005

(65) Prior Publication Data

US 2006/0115065 A1    Jun. 1, 2006

(30) Foreign Application Priority Data

Nov. 29, 2004    (JP) ................................. 2004-343255

(51) Int. Cl.
*H04M 1/00* (2006.01)
(52) U.S. Cl. ............... 379/355.02; 379/88.2; 379/88.19; 379/88.21; 379/127.06; 379/207.15; 370/352; 370/389; 370/401
(58) Field of Classification Search ............... 379/88.18, 379/355.02, 201.06, 201.07; 455/445, 456.1, 455/419
See application file for complete search history.

(56) References Cited

U.S. PATENT DOCUMENTS

| 6,256,382 | B1 | 7/2001 | Toda |
| 6,603,973 | B1* | 8/2003 | Foladare et al. ............... 455/445 |
| 7,006,833 | B1* | 2/2006 | Contractor ................. 455/456.1 |
| 2001/0024951 | A1* | 9/2001 | Rignell et al. ................ 455/414 |
| 2001/0047263 | A1* | 11/2001 | Smith et al. .................. 704/275 |
| 2003/0134626 | A1* | 7/2003 | Himmel et al. ............... 455/419 |
| 2003/0179864 | A1* | 9/2003 | Stillman et al. ............ 379/88.18 |
| 2005/0070282 | A1* | 3/2005 | Hinz .......................... 455/435.1 |
| 2006/0121904 | A1* | 6/2006 | Reuhkala et al. ............. 455/445 |

FOREIGN PATENT DOCUMENTS

JP    11-234389    8/1999

* cited by examiner

*Primary Examiner* — Joseph J Nguyen
(74) *Attorney, Agent, or Firm* — Canon USA, Inc., I.P. Division

(57) ABSTRACT

A control method of a communication terminal having a telephone directory user interface and a communication system, the control method and system include storing a plurality of telephone numbers corresponding to a destination user as telephone directory data, requesting a notification of location information of the destination user to a server, receiving location information of the destination user from a server, and displaying a telephone number corresponding to a current location of the destination user.

13 Claims, 8 Drawing Sheets

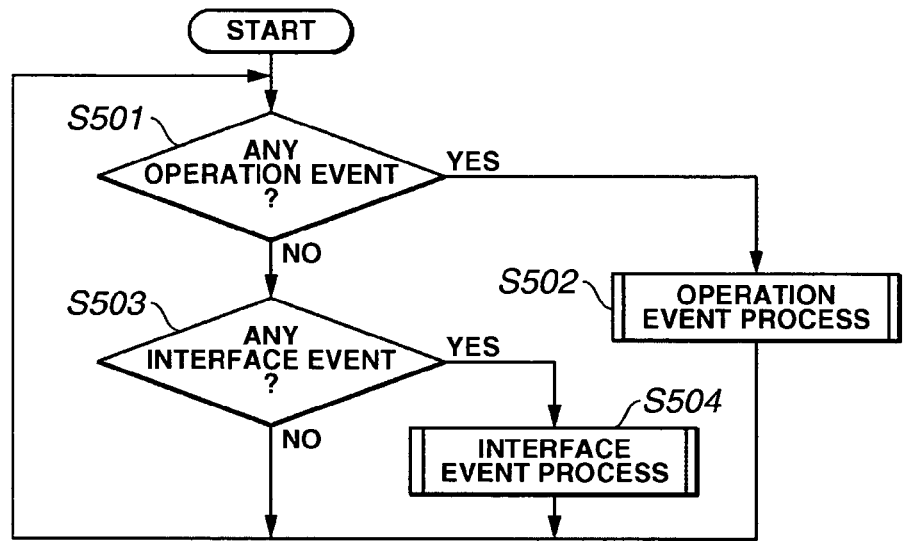
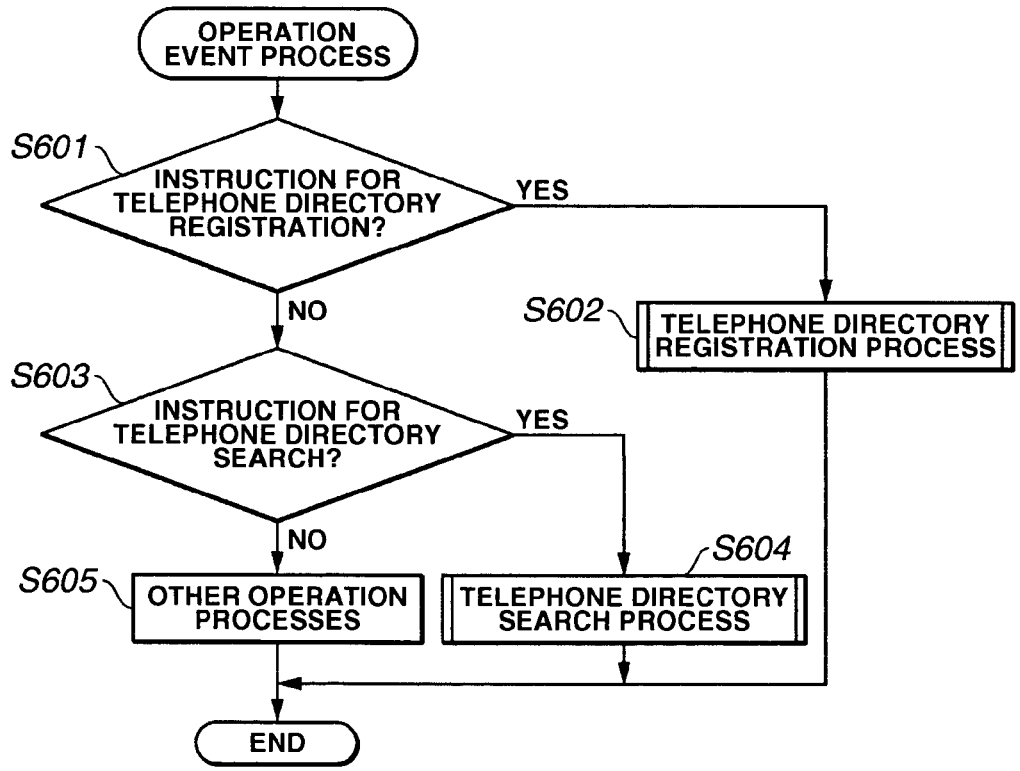

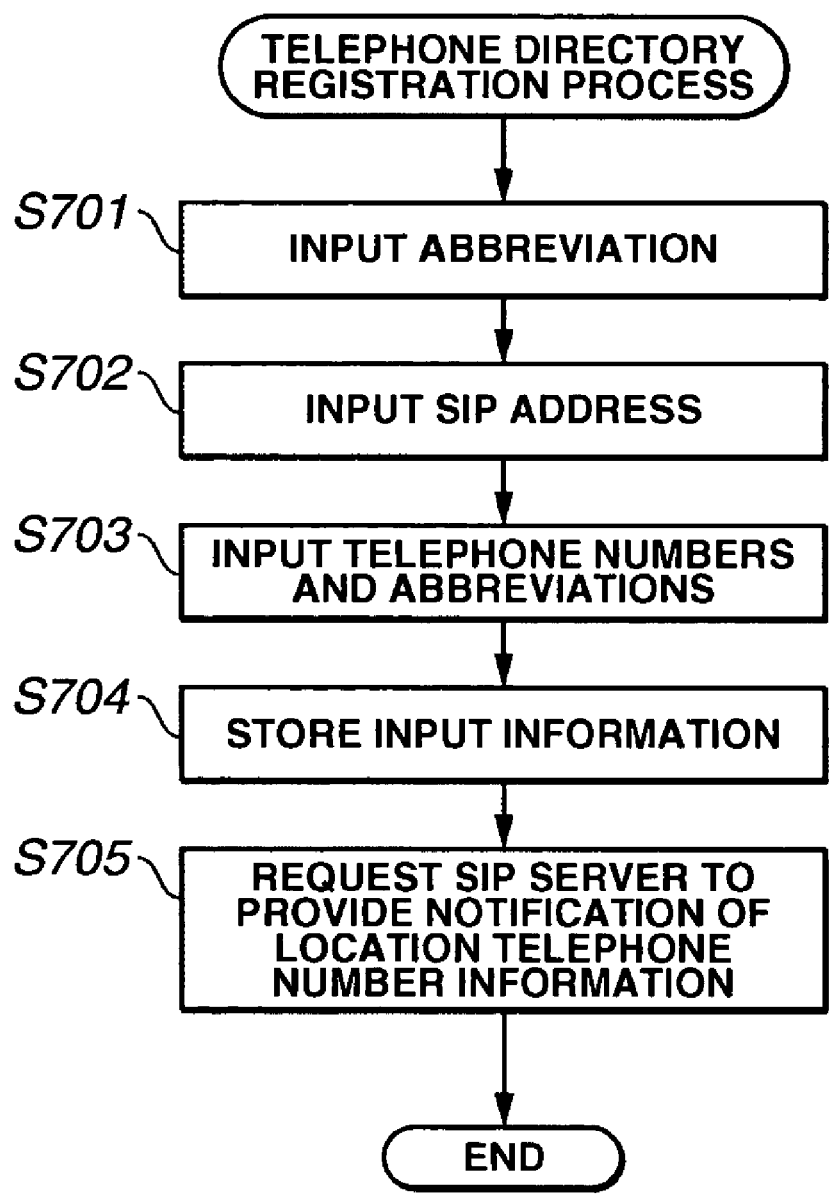

CONTROL METHOD OF COMMUNICATION TERMINAL THE COMMUNICATION TERMINAL AND CONTROL PROGRAM OF THE COMMUNICATION TERMINAL

BACKGROUND OF THE INVENTION

1. Field of the Invention

The present invention relates to a communication terminal having a telephone directory user interface that can register a plurality of telephone numbers for one destination, a control method of the communication terminal, and a control program of the communication terminal.

2. Description of the Related Art

In the conventional communication terminal having a telephone directory user interface that can register a plurality of telephone numbers for one destination, a technology is well-known that increases the chance of successfully originating a call by displaying the telephone number corresponding to a specific condition and using the telephone number in originating the call.

Examples of the technologies relating to ordering telephone numbers in a display when an arbitrary destination is selected include the following: registering a corresponding priority order concurrent with registering the telephone numbers of a destination, and displaying the telephone numbers in accordance with the priority order when selecting the destination from the telephone directory (e.g., see Japanese Patent Application Laid-Open No. 11-234389); registering a corresponding priority time zone, and displaying the telephone number where the current time is in the priority time zone by referring to the current time when selecting the destination from the telephone directory (e.g., see Japanese Patent Application Laid-Open No. 11-234389)

The above-described conventional technologies however, do not allow a user to reach the destination with any certainty and do not reliably guarantee a successful telephone call will be established. They merely display telephone numbers based on a priority value associated with the telephone numbers with the intent of reaching the destination in the most likely order.

In the conventional technologies described above, in some cases, the telephone number by which the destination can actually be reached may be located at a lower rank in the display order. In such cases, if the display order is followed, several telephone calls must be made before reaching the destination, resulting in increased toll charges, time consumption, and inconvenience in use.

SUMMARY OF THE INVENTION

An aspect of the present invention is to overcome the above-described drawbacks. The present invention is directed to displaying a telephone number on the telephone directory user interface of the communication terminal so as to make a successful call with certainty.

In one aspect of the present invention, a communication terminal, a control program of the communication terminal, and a control method of the communication terminal, having a telephone directory user interface that can register a plurality of telephone numbers for one destination, include storing a plurality of telephone numbers corresponding to a destination user as a telephone directory data, requesting a notification of location information of the destination user to a server, receiving location information of the destination user, and displaying, when the destination user is selected at the telephone directory user interface, a telephone number corresponding to a current location of the destination user.

The above configuration allows for telephone number information relating to the actually detected current location of the destination user registered in the telephone directory to be displayed on the telephone directory user interface. Thus, the user can effectively acquire telephone number information relating to the current location of the destination user registered in the telephone directory via the telephone directory user interface. Moreover, the destination user can be immediately called so that communication to the destination user is performed with certainty. Furthermore, the location of the destination user can determined from the telephone number displayed on the telephone directory user interface even when an actual call is not made.

Further features of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 is a flowchart showing a communication control procedure of the IP telephone of the present invention.

FIG. 6 is a flow chart showing a flow of the operation event process of FIG. 5.

FIG. 7 is a flow chart showing a flow of the telephone directory registration process of FIG. 6.

DETAILED DESCRIPTION OF THE EMBODIMENTS

Embodiments of the invention will be described in detail below with reference to the Figures. For discussion purposes, an IP telephone will be used to describe a communication terminal according to the present invention. The present invention is not limited to an IP telephone and any communication terminal that would enable practice of the present invention is applicable.

Figure 1:
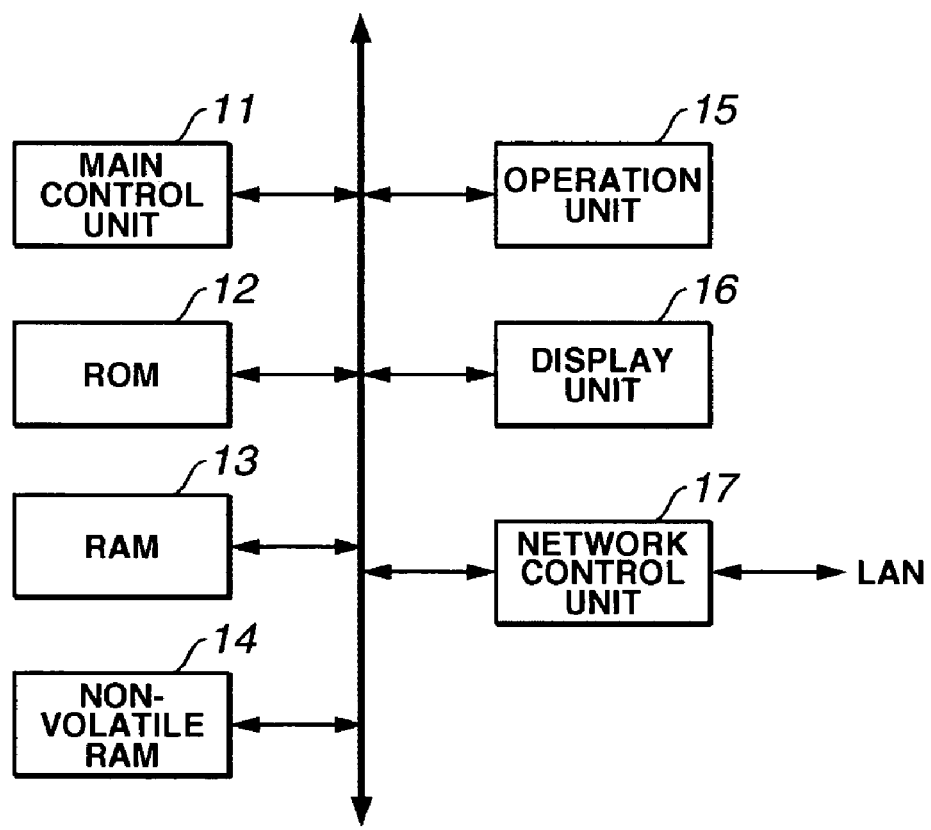
FIG. 1 is a block chart of a control system of an IP telephone of the present invention.

FIG. 1 shows a configuration of the control system of the IP telephone 21 of the present invention. Referring to FIG. 1, a main control unit 11 controls the entire IP telephone 21, which includes a RAM 13, a non-volatile RAM 14, an operation unit 15, a display unit 16, and a network control unit 17, in accordance with a program stored on a ROM 12.

The RAM 13 is used as a working data storing area for operating the IP telephone 21. The non-volatile RAM 14 is an SRAM with back-up battery, and stores various data associated with the destination users registered in telephone directory of the IP telephone 21 and data set by a user of the IP telephone 21.

The operation unit 15 is a user interface unit for inputting telephone numbers, for registering information in the IP telephone 21, and for performing search or registration of the IP telephone's 21 telephone directory. The operation unit 15 includes the display unit 16 and an input device (e.g., keyboard) (not shown).

The network control unit 17 controls the IP telephone's 21 interface with a network, such as the Internet. The network control unit 17 supports various communication protocols, such as UDP/IP and TCP/IP, for communicating with the network connected to the IP telephone 21. The network control unit 17 also supports a SIP (Session Initiation Protocol) for performing an IP telephone communication on these basic protocol layers. SIP is the protocol for managing a session (e.g., originating and answering a call) that connects terminals which communicate with each other. This protocol can be easily mounted in a real-time communication, and often used in IP telephones.

SIP functions include a function known as "presence". The "presence" function allows a user to obtain status information of a destination user provided that a SIP address of the destination user is known. According to the present embodiment, whereabouts of the destination user entered in the IP telephone's 21 telephone directory are confirmed using the "presence" function.

Figure 2:
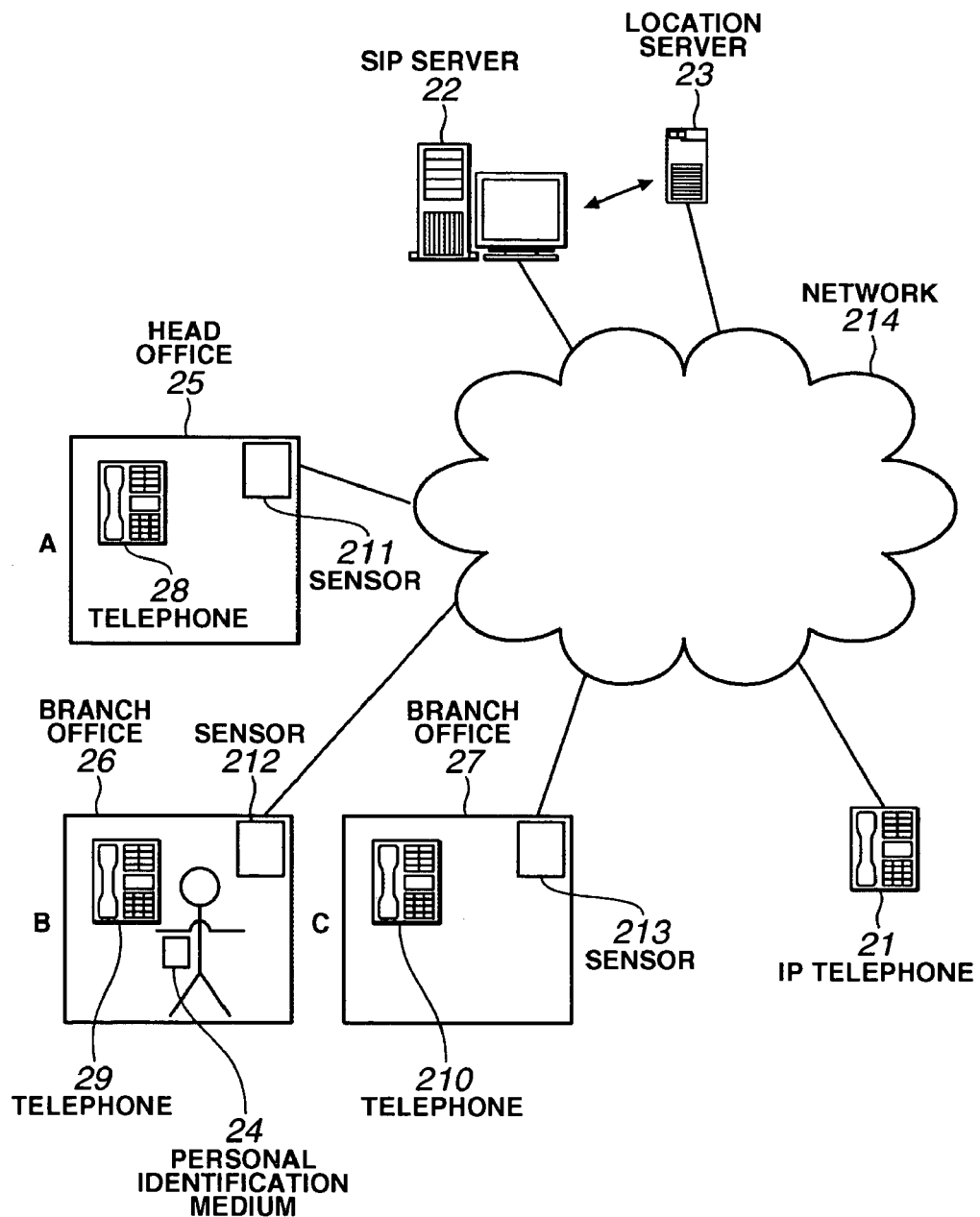
FIG. 2 depicts an example of a system according to the present invention.

FIG. 2 depicts an example of a system according to the present invention. Referring to FIG. 2, IP telephone 21 is connected to a network 214. The network 214 includes the Internet, a local Intranet, and a network formed by using a technology such as VPN on the Internet, which are capable of performing IP communication as well as various upper layer protocol communications such as TCP and UDP. Reference numeral 22 denotes a SIP server positioned on the network 214, which manages the communication in accordance with the SIP protocol.

Reference numeral 23 denotes a location server positioned on the network 214, which responds to a reference to storage of location registration information or location information from the SIP server 22. Moreover, the location server 23 contains information related to telephone numbers and location.

Reference numeral 24 denotes a personal identification medium containing personal identification information. For simplicity purposes, the following example will use an IC card as example of the personal identification medium 24. However, any other type of personal identification medium that would enable practice of the present invention is applicable. The IC card 24 stores SIP address information allocated to a specific IC card 24 owner. Reference numerals 25, 26 and 27 denote locations where the IC card 24 owner frequents (e.g., head office (A), branch office (B), and branch office (C)). A telephone 28 and a sensor 211 are located in the head office (A) 25.

Telephone 28 is a telephone connected to a normal telephone subscriber line. Sensor 211 can detect the presence of the IC card 24. In one embodiment, sensor 211 is mounted on a security card reader located in a room in head office (A) 25 or at the entrance to head office (A) 25. When the IC card 24 owner passes the IC card 24 either through or by the reader, the SIP address information stored on the IC card 24 is read by sensor 211. Sensor 211, which has a network interface, detects the presence of the IC card 24, confirms the SIP address information on the IC card 24, and notifies the SIP server 22 via the network 214 of the presence of the IC card 24 using SIP. Any other method that would enable sensor 211 to detect the presence of the IC card 24 is applicable.

In FIG. 2, reference numeral 26 denotes a branch office (B), with telephone 29 and sensor 112. Reference numeral 27 denotes a branch office (C), with telephone 210 and sensor 213.

According to the above configuration, even if an IC card 24 owner moves between the head office (A) 25 and the branch offices (B) 26 and (C) 27, the current location of the IC card 24 owner can be managed at the location server 23 by detecting the presence of IC card 24 at sensors 211, 212, or 213, and by requesting the SIP server 22 to register the location data accordingly. A sequence of discovering, at the IP telephone 21, the telephone number, and the whereabouts of the current position of the destination user entered in the IP telephone's 21 telephone directory is described later with respect to FIG. 4.

Figure 3:
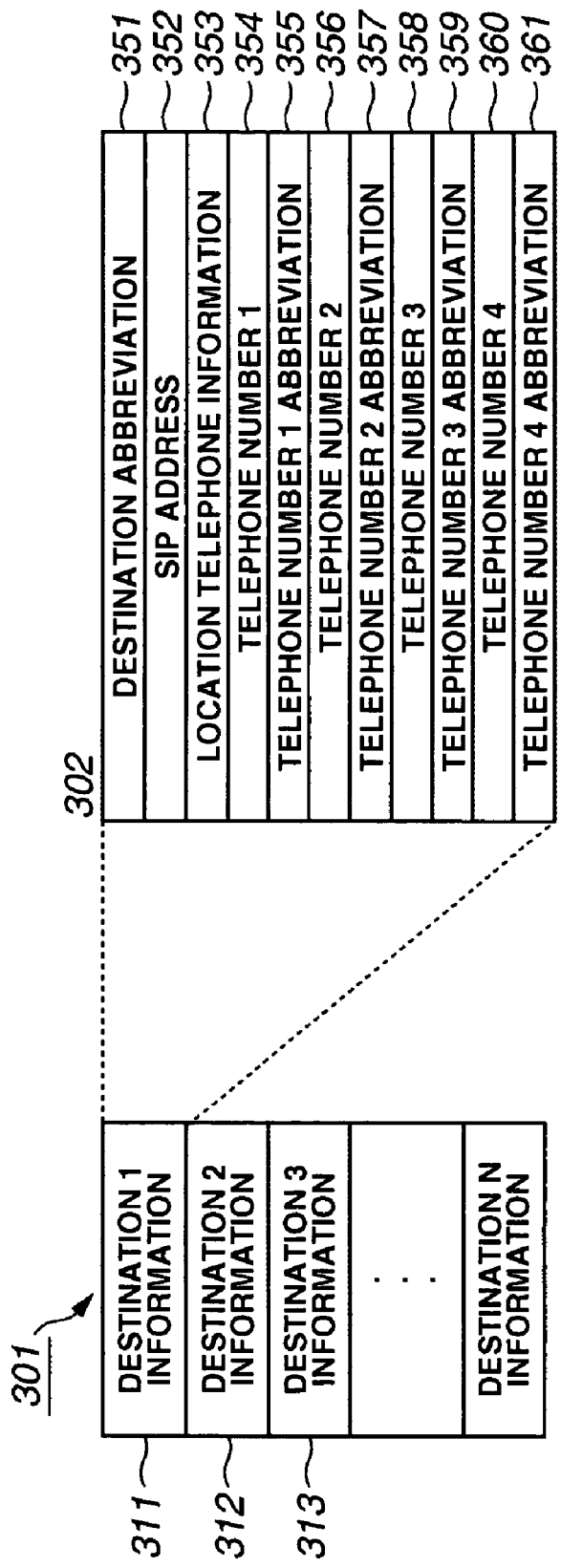
FIG. 3 is an explanatory view showing a configuration of a destination registration area of a telephone directory stored in the non-volatile RAM of FIG. 1.

FIG. 3 shows a configuration of a destination user registration area 301 of the IP telephone's 21 telephone directory stored in the non-volatile RAM 14 according to the present embodiment. The destination user registration area 301 is divided into information areas for every destination user, i.e., destination 1 information 311, destination 2 information 312, destination 3 information 313, etc. N is the number of maximum destination users that can be registered.

FIG. 3 also depicts an example of the configuration of memory area 302 of each destination user information. More specifically, destination abbreviation 351 stores an abbreviation of the destination user, SIP address 352 corresponds to the SIP address information of the personal identification medium 24 possessed by the destination user associated with the destination abbreviation 351, location telephone information 353 stores the telephone number information of the current location of the destination user provided by the SIP server 22, first telephone number 1 354 stores a first telephone number of the destination user, telephone number 1 abbreviation 355 stores the abbreviation of the first telephone number 1 354, similarly, second telephone number 2 356 and second telephone 2 abbreviation 357 store a second telephone number and associated abbreviation, third telephone number 3 358 and telephone number 3 abbreviation 359 store a third telephone number and associated abbreviation, and telephone number 4 360 and telephone number 4 abbreviation 361 store a fourth telephone number and associated abbreviation. All of above items, except the location telephone information 353, are input by a user via the operation unit 15.

Figure 4:
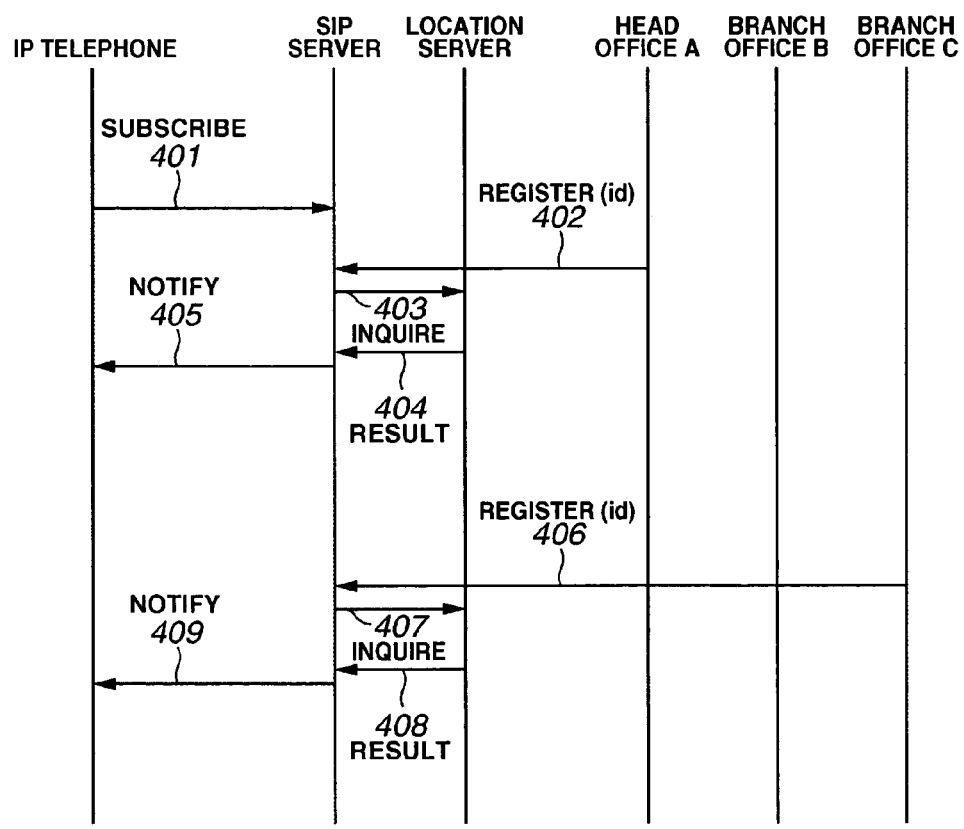
FIG. 4 is a sequence diagram showing a communication control for acquiring the telephone number of the current location of a destination user registered in a telephone directory of the IP telephone of the present invention.

FIG. 4 is a sequence chart showing, in a time series fashion, a mechanism of acquiring the telephone number information of the current location of the destination user registered in the IP telephone's 21 telephone directory. When the destination user information is registered in the IP telephone's 21 telephone directory, a subscribe signal is transmitted (step S401) to the SIP server 22 using the SIP address of the destination user acquired from the personal identification medium 24 as an argument.

The subscribe signal is a signal requesting notification of information change relating to the SIP address of the personal identification medium 24. A location telephone number is indicated as change factor information for this subscribe signal.

The location telephone number is telephone number information of one of the fixed telephones (28, 29, and 210) which is obtained from the current location of the personal identification medium 24. Conversion of the current location of the personal identification medium 24 to the telephone number is performed at the location server 23 and is described below.

The SIP server 22 receiving the subscribe signal stores a SIP address of the requester (IP telephone 21), the SIP address to be watched (personal identification medium 24), and the change factor.

When a destination user, with a personal identification medium 24, enters the head office (A) 25, sensor 211 detects the presence of the personal identification medium 24. Sensor 211 reads the SIP address from the personal identification medium 24, and transmits a register signal to the SIP server 22 (step 402), using the SIP address as an argument.

The register signal is a signal that registers the status information and the location information of the personal identification medium 24. The SIP server 22 receiving the register signal registers the received registration information on the location server 23. Then, the SIP server 22 checks whether the request for notification of information change has arrived. If the request has arrived, the SIP server 22 queries the location server 23 about location telephone number information based on the location information (step 403). The location server 23 receiving the inquiry converts it to the location telephone number information by referring to an internal information table, and notifies the SIP server 22 with the result(s) (step 404).

The SIP server 22 transmits a notify signal to the IP telephone 21, which requested the notification of information change (step 405), and provides the location telephone number information thereto. The notify signal is a signal notifying the change in the information requested by the subscribe signal.

The IP telephone 21 receiving the notify signal compares the transmitted SIP address and the SIP address 352 of the destination user in the IP telephone's 21 telephone directory, and stores the transmitted location telephone information in the location telephone information 353 of the matching destination.

Next, when the destination user, with the personal identification medium 24, moves to the branch office (C) 27, a register signal is transmitted from sensor 213 of the branch office (C) 27 to the SIP server 22, and the location information is notified thereto (step 406).

The SIP server 22 queries the location server 23 regarding the location telephone number information (step 407). The location server 23 notifies the SIP server 22 of the location telephone number information step 408).

A notify signal is transmitted from the SIP server 22 to the IP telephone 21 (step 409). As a result, the location telephone number information, that is, notification of the telephone number information of the current fixed telephone (28, 29, 210) of the destination user, which possesses the personal identification medium 24), is provided.

The IP telephone 21 receiving the notify signal compares the transmitted SIP address and the SIP address 352 of the destination user in the IP telephone's 21 telephone directory, and stores the transmitted location telephone information in the location telephone information 353 of the matching destination.

FIG. 5 shows the communication control procedure of the IP telephone 21 of the present invention. The control procedure of FIG. 5, as well as the processes of the flowcharts described below, is stored in the ROM 12 of IP telephone 21 as a control program which is executed by the CPU (not shown) of the main control unit 11.

In step S501 of FIG. 5, the process checks whether any operation event has occurred from the operation unit 15. If an event has occurred, flow proceeds to step S502, where the operation event process is executed as described below with respect to FIG. 6. The process returns to step S501 after the operation event process finishes.

If no operation event is found in step S501, then in step S503, the process checks whether any interface event has occurred from the network at the network control unit 17. If an event has occurred, the interface event process is executed in step S504. The process returns to step S501 after the interface event finishes.

FIG. 6 shows a flow of the operation event process (step S502) of FIG. 5. In step S601 in FIG. 6, the process checks whether the operation event is a telephone directory registration instruction. If the operation event is a telephone directory registration instruction, flow proceeds to step S602, where the telephone directory registration process is performed as described below with respect to FIG. 7.

If the telephone directory registration instruction is not made in step S601, then the process checks in step S603 whether the operation event is a telephone directory search instruction. If the operation event is a telephone directory search instruction, the telephone directory search process is performed in step S604 as described below with respect to FIG. 8.

If the operation event is not the telephone directory search instruction in step S603, then other operation processes are performed in accordance with the instructed operations in step S605.

FIG. 7 indicates a flow of the telephone directory registration process (step S602) of FIG. 6. In step S701 of FIG. 7, a destination user abbreviation is input from the operation unit 15. In step S702, the SIP address of the personal identification medium 24 possessed by the destination user which is to be registered is input from the operation unit 15. In step S703, a plurality of telephone number abbreviations and the telephone numbers where the destination user frequents or is typically located are input from the operation unit 15.

The following process of storing the above inputted information is performed in step S704. The abbreviation inputted in step S701 is stored in the destination abbreviation area 351 of the non-volatile RAM 14. Similarly, the SIP address inputted in step S702 is stored in the SIP address area 352. Furthermore, the plurality of telephone numbers and abbreviations inputted in step S703 are stored in areas 354 to 361. Then, in step S705, the subscribe signal is transmitted to the SIP server 22 (step S401 of FIG. 4) so that notification of the telephone number information will be provided when the location of the SIP address inputted in step S702 has changed, as described above.

Figure 8:
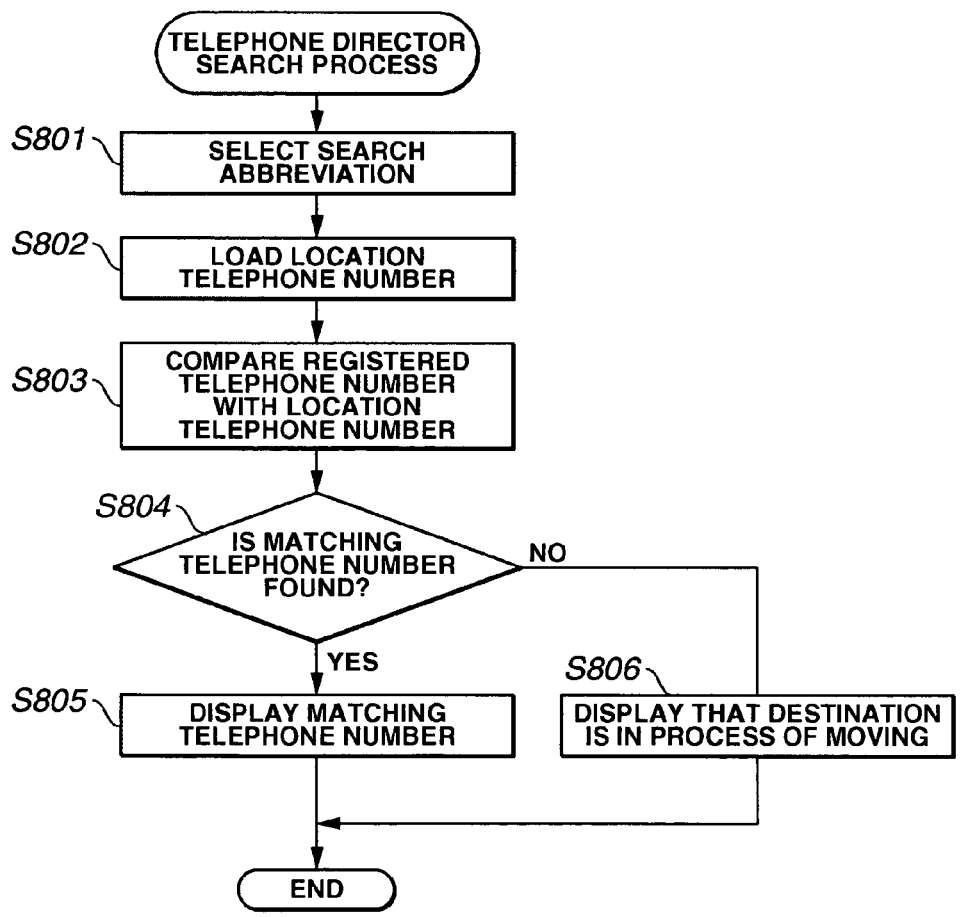
FIG. 8 is a flow chart showing a flow of the telephone directory search process of FIG. 6.

FIG. 8 is a flow chart of the telephone directory search process (step S604) of FIG. 6. In step S801 of FIG. 8, a user operates the operation unit 15 to select the destination user abbreviation to be searched. In step S802, contents of the location telephone information 353 corresponding to the destination user abbreviation selected by the user is loaded.

In step S803, the registered telephone numbers (354, 356, 358 and 360) and the loaded location telephone information are compared. In step S804, the process decides if there is any matching telephone number.

If a matching telephone number is found in step S804, then in step S805, the process displays the matching telephone number (e.g., one of the telephone numbers of the fixed telephones 28, 29 and 210) on the display unit 16. If a matching telephone number is not found, then in step S806, the process displays "in process of moving" on the display unit 16.

Further, with respect to displaying the matching telephone number in step S805, in another embodiment, instead of displaying only the telephone number matching the location telephone information, the plurality of registered telephone numbers can be displayed at the same time and the telephone number matching the location telephone information is highlighted or a cursor appears under the matching telephone number. This enables the telephone number to be called immediately. The above described display methods are just examples and any method for displaying the matching telephone number that would enable practice of the present invention is applicable.

Figure 9:
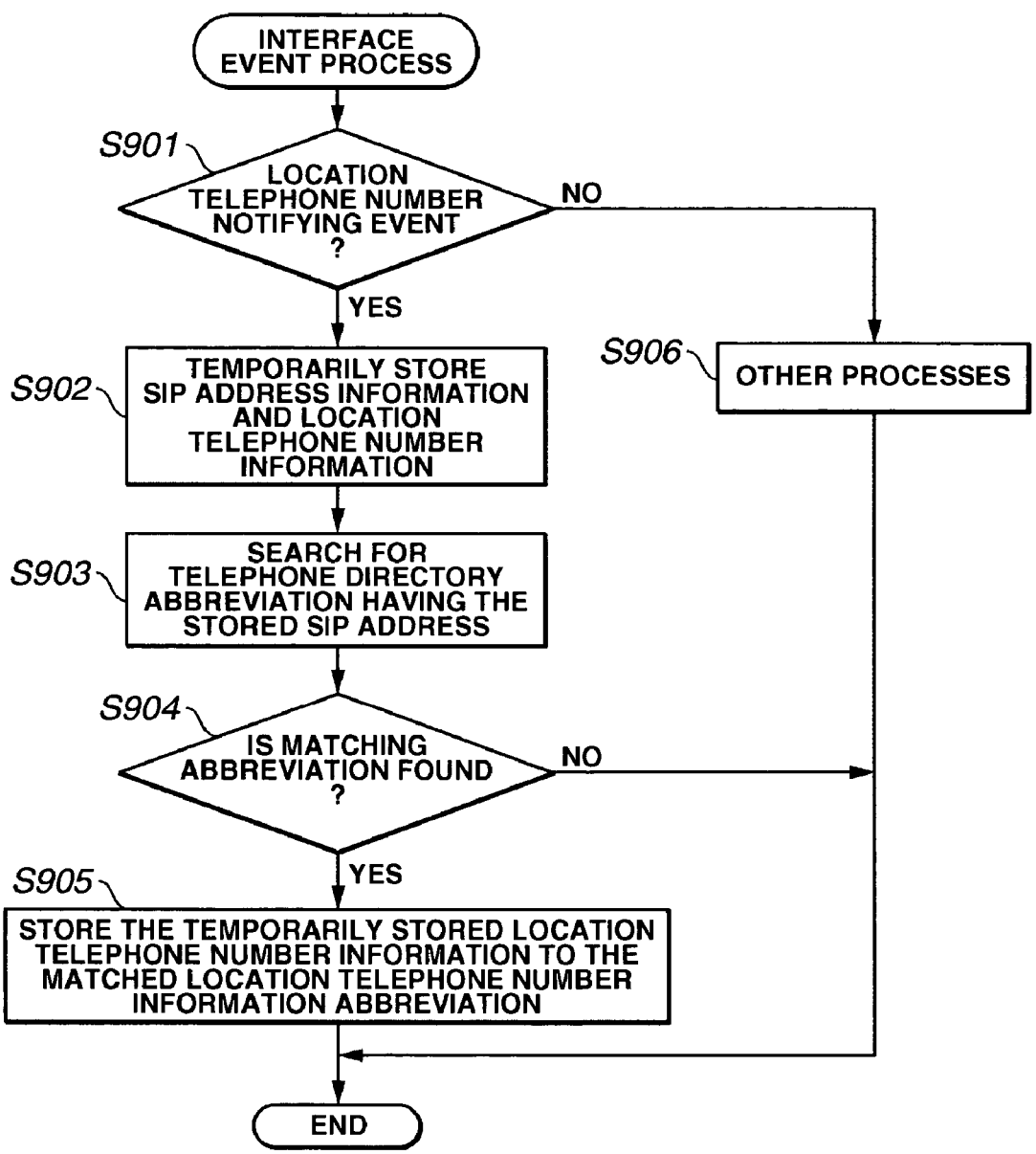
FIG. 9 is a flow chart showing a flow of the interface event process of FIG. 5.

FIG. 9 shows a flow of the interface event process (step S504) in FIG. 5. In steps 901 of FIG. 9, the process checks whether the generated interface event is the location telephone number notification event based on the notify signal received from the SIP server 22 (step S405 or S409 of FIG. 4). If the generated interface event is not the location telephone number notification event, then other processes in accordance with the generated event are performed in step S906.

If the generated interface event is the location telephone number notification event in step S901, the location telephone number information and the SIP address information provided by the notify signal in step S902 are temporarily stored in the RAM 13 within the IP telephone 21. In step S903, the process searches for any telephone directory abbreviation having the SIP address matching the stored SIP address in the destination information area 301 of the IP telephone's 21 telephone directory.

In step S904, if a matching abbreviation is found, then in step S905, the location telephone number information temporarily stored in step S902 is stored in the location telephone information 353 of the matching abbreviation, and the process updates the telephone number information with respect to where the destination user is currently located.

As described above, according to the present embodiment, in order to display the destination user via the telephone directory user interface of the IP telephone, the telephone number relating to the current location actually detected can be displayed.

As a result, the user can recognize the telephone number information relating to the current location of the destination user registered in the IP telephone's 21 telephone directory via the telephone directory user interface.

According to the present embodiment, when the user selects the destination user in the telephone directory user interface, the telephone number of the current location of the destination user is selected and displayed. Furthermore, the destination user can be immediately called. In this way, it is possible to communicate with the destination user with some certainty, and the usability for the communicating with the destination user is improved.

Moreover, according to the present embodiment, the location of the destination user can be determined from the telephone number displayed on the telephone directory user interface without making the actual call.

As previously stated, the communication terminal described above is referred to as an "IP telephone". However, any type of communication terminal that would enable practice of the present invention is applicable.

The software for implementing a program or method of the present invention can be stored in a storage media, such as a ROM or a hard disk drive (HDD) of the communication terminal prior during the manufacturing process of the communication terminal. Alternatively, the software may be downloaded to the communication terminal after manufacturing or updated via the network.

The communication protocol described above is the SIP protocol. However, any protocol that would enable IP telephone communication to recognize the destination user location from the telephone number is applicable.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims priority from Japanese Patent Application No. 2004-343255 filed Nov. 29, 2004, which is hereby incorporated by reference herein in its entirety.

What is claimed is:

1. A method to select a telephone number for display on a display unit of a user telephone, the method comprising:

storing, in the user telephone, a name and identification of a destination user, wherein the identification corresponds a personal identification medium of the destination user;

storing, in the user telephone, a plurality of telephone numbers in association with the name and identification of the destination user, wherein each telephone number corresponds to a landline telephone, wherein each landline telephone is part of a plurality of landline telephones, is fixed in its location, is located remote from the remaining landline telephones in the plurality of landline telephones, and is situated in a location where the destination user has been previously determined to frequent and that contains a sensor configured to sense the personal identification medium and to read the identification of the destination user contained on the personal identification medium;

transmitting a subscribe signal from the user telephone to a server, wherein the subscribe signal includes the identification of the destination user and a request to receive a location telephone number that is linked to the identification of the destination user;

receiving, from the server in the user telephone in response to the subscribe signal, a first location telephone number;

determining whether the received first location telephone number matches a telephone number, as a matching telephone number, from the plurality of telephone numbers stored in the user telephone;

displaying, in a case where it is determined that the received first location telephone number matches a telephone number from the plurality of telephone numbers stored in the user telephone, the matching telephone number on the display unit in a way that permits a user of the user telephone to call the matching telephone number immediately so as to increase the chance of establishing a telephone call between the user of the user telephone and the destination user through a first landline telephone in the plurality of landline telephones;

receiving, from the server in the user telephone in response to the subscribe signal, a second location telephone number after receiving the first location telephone number; and replacing, in a case where it is determined that the received second location telephone number matches a telephone number from the plurality of telephone numbers stored in the user telephone, the telephone number displayed on the display unit with the telephone number from the plurality of telephone numbers stored in the user telephone that matches the received second location telephone number in a way that permits a user of the user telephone to call the displayed telephone number immediately so as to increase the chance of establishing a telephone call between the user of the user telephone and the destination user through a second landline telephone in the plurality.

2. The method of claim 1, further comprising:
receiving, from the server in the user telephone in response to the subscribe signal, a first identification along with the first location telephone number;
determining whether the first identification matches an identification, as a matching identification, stored in the user telephone; and
storing, in a case where it is determined that the first identification matches an identification stored in the user telephone, the received first location telephone number in a location telephone number area associated with the matching identification.

3. The method of claim 2, further comprising:
receiving, from the server in the user telephone in response to the subscribe signal, a second identification along with a second location telephone number after receiving the first location telephone number;
replacing, in a case where it is determined that the second identification matches an identification stored in the user telephone, the received first location telephone number with the received second location telephone number in the location telephone number area associated with the matching identification; and
replacing, in a case where it is determined that the received second location telephone number matches a telephone number from the plurality of telephone numbers stored in the user telephone, the telephone number displayed on the display unit with the telephone number from the plurality of telephone numbers stored in the user telephone that matches the received second location telephone number in a way that permits a user of the user telephone to call the displayed telephone number immediately so as to increase the chance of establishing a telephone call between the user of the user telephone and the destination user through a second landline telephone in the plurality of landline telephones.

4. The method of claim 1, further comprising:
displaying, in a case where it is determined that the received first location telephone number does not match a telephone number from the plurality of telephone numbers stored in the user telephone, a message on the display unit that conveys in process of moving.

5. The method of claim 1, wherein displaying includes displaying only the matching telephone number on the display unit.

6. The method of claim 1, wherein displaying includes displaying at least some of plurality of telephone numbers associated with those locations where the destination user has been previously determined to frequent and wherein displaying the matching telephone number on the display unit in a way that permits a user of the user telephone to call the matching telephone number immediately includes at least one of highlighting the displayed matching telephone number and positioning a cursor under the displayed matching telephone number.

7. The method of claim 1, further comprising:
determining whether there is an operation event or an interface event.

8. The method of claim 7, wherein if it is determined that there is an operation event, then the method further comprises:
determining whether the operation event is a telephone directory registration instruction or is a telephone directory search instruction.

9. The method of claim 1, wherein the first location telephone number is linked to the identification of the destination user after transmitting the subscribe signal from the user telephone to the server.

10. The method of claim 1, further comprising:
converting the matching telephone number displayed on the display unit into a location designation that corresponds to the whereabouts location of the destination user without calling the matching telephone number.

11. The method of claim 1, wherein the user telephone is an internet protocol (IP) telephone.

12. A user telephone to select a telephone number for display on a display unit of a user telephone, the user telephone comprising:
a storage unit (i) configured to store a name and identification of a destination user, wherein the identification corresponds a personal identification medium of the destination user and (ii) configured to store a plurality of telephone numbers in association with the name and identification of the destination user, wherein each telephone number corresponds to a landline telephone, wherein each landline telephone is part of a plurality of landline telephones, is fixed in its location, is located remote from the remaining landline telephones in the plurality of landline telephones, and is situated in a location where the destination user has been previously determined to frequent and that contains a sensor configured to sense the personal identification medium and to read the identification of the destination user contained on the personal identification medium;
a transmitting unit configured to transmit a subscribe signal to a server, wherein the subscribe signal includes the identification of the destination user and a request to receive a location telephone number that is linked to the identification of the destination user;
a receiving unit configured to receive, from the server in response to the subscribe signal, a first location telephone number;
a controller configured to determine whether the received first location telephone number matches a telephone number, as a matching telephone number, from the plurality of telephone numbers stored in the storage unit; and
the display unit configured to display, in a case where it is determined that the received first location telephone number matches a telephone number from the plurality of telephone numbers stored in the storage unit, the matching telephone number on the display unit in a way that permits a user of the user telephone to call the matching telephone number immediately so as to increase the chance of establishing a telephone call between the user of the user telephone and the destination user through a first landline telephone in the plurality of landline telephones, wherein
the receiving unit further is configured to receive, from the server in response to the subscribe signal, a second location telephone number after receiving the first location telephone number, and
the controller further is configured to replace, in a case where it is determined that the received second location telephone number matches a telephone number from the plurality of telephone numbers stored in the storage unit, the telephone number displayed on the display unit with the telephone number from the plurality of telephone numbers stored in the storage unit that matches the received second location telephone number in a way that permits a user of the user telephone to call the displayed telephone number immediately so as to increase the chance of establishing a telephone call between the user of the user telephone and the destination user through a second landline telephone in the plurality of landline telephones.

13. The user telephone of claim 12, wherein
the controller further is configured to convert the matching telephone number displayed on the display unit into a location designation that corresponds to the whereabouts location of the destination user without calling the matching telephone number.

* * * * *